United States Patent [19]
Ryan et al.

[11] Patent Number: 5,947,430
[45] Date of Patent: Sep. 7, 1999

[54] SUPPORT TRIPOD

[75] Inventors: Steven T. Ryan, Newbury; Ulf B. Heide, Marblehead, both of Mass.

[73] Assignee: Technical Manufacturing Corporation, Peabody, Mass.

[21] Appl. No.: 08/878,286

[22] Filed: Jun. 18, 1997

[51] Int. Cl.[6] .................................................. F16M 11/00
[52] U.S. Cl. ................................. 248/163.1; 248/188.8; 52/126.5; 52/126.2
[58] Field of Search .............................. 248/163.1, 163.2, 248/164, 188.8, 188.9, 188.91, 638, 174, 188.1, 351; 52/126.5, 126.2

[56] References Cited

U.S. PATENT DOCUMENTS

| | | | |
|---|---|---|---|
| 3,081,059 | 3/1963 | Hastings et al. | 248/163.1 X |
| 3,262,406 | 7/1966 | Nickolaisen | 248/163.1 X |
| 4,324,477 | 4/1982 | Miyazaki | 248/163.1 |
| 4,339,880 | 7/1982 | Hall | 248/163.1 X |
| 4,852,836 | 8/1989 | Kawazoe | 248/188.8 X |
| 5,003,328 | 3/1991 | Gaynor | 248/188.8 X |

*Primary Examiner*—Derek J. Berger
*Assistant Examiner*—Long Dinh Phan
*Attorney, Agent, or Firm*—Samuels, Gauthier & Stevens

[57] ABSTRACT

A tripod has an adjustable top plate that supports an equipment foot. The support legs each comprise paired plates. Interposed between the paired plates is a damping material. The damping material damps the tripod and inhibits resonance from passing through the tripod to the supported equipment.

6 Claims, 3 Drawing Sheets

SUPPORT TRIPOD

FIELD OF THE INVENTION

The invention relates to a damped support tripod and leveling stand.

BACKGROUND AND BRIEF SUMMARY OF THE INVENTION

In a cleanroom environment, such as in semiconductor manufacture, there is typically a raised floor supported on a concrete sub-floor. The sub-floor is usually characterized by 'pop outs' or large circular holes for utility requirements. An exemplary cleanroom can have a 24" high raised-floor over a concrete sub-floor. The sub-floor can have a grid of 14" diameter holes or pop-outs on 24" spacing.

The installation of various semiconductor fabrication, inspection and process equipment in a cleanroom environment having a raised floor requires special consideration regarding the support of such equipment. Typically, such equipment is either too massive or too vibration sensitive to be placed directly on the lightweight raised floor. A structural support is required to "bridge" the floor height. The support must be a stiff, non-resonant structure having a high load capacity, thereby extending the rigidity of the concrete subfloor to the height of the raised cleanroom floor.

Supports, such as concrete blocks and welded steel frame structures have been used, but lack of portability, cost and the need to design a frame structure for each piece of supported equipment are among their drawbacks. Tripod leveling stands supporting a damped support plate have also been used to support the equipment.

Regardless of the support used, an opening is formed in the raised floor in order that the equipment foot can directly engage the support.

It is desirable that there be positioning flexibility in the structural supports to allow for alignment of the support directly underneath the equipment feet (point load). It is also desirable that the integrity of a "flow through" design in a cleanroom be maintained by maximizing any air flow between the cleanroom and the space defined by the raised floor and the sub-floor.

The invention embodies a rigid support tripod that satisfies the objectives of rigidity, non-resonance, flexibility and high load capacity. The tripod has a top plate that supports an equipment foot. The tripod is configured such that it can allow the equipment to be mounted in any configuration over the sub-floor, regardless of pop-out locations. The tripod is adjustable such that the top plate can be made co-planar with the surface of the raised floor. Further, the top plate is dimensioned such that it mates with the opening in the raised floor to maintain the rectangular grid pattern of the raised floor.

Broadly the invention comprises a tripod for equipment support. The tripod has damped adjustable legs. The top plate is moveable such that it can be positioned to match the opening formed in the raised floor.

BRIEF DESCRIPTION OF THE DRAWING(S)

DESCRIPTION OF THE PREFERRED EMBODIMENT(S)

Figure 1:
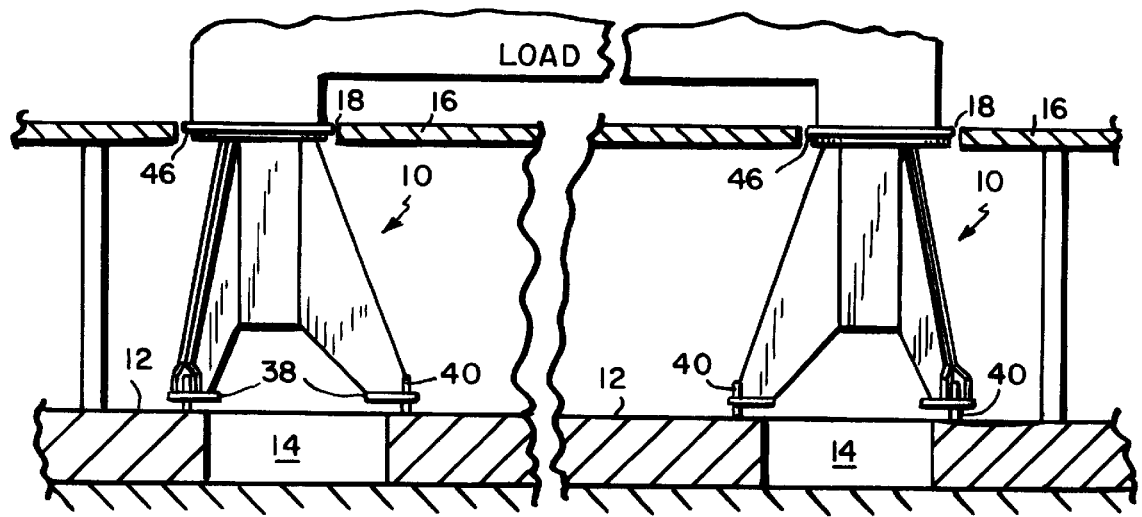
FIG. 1 is a schematic illustration of support tripod embodying the invention in a cleanroom environment.
Figure 2:
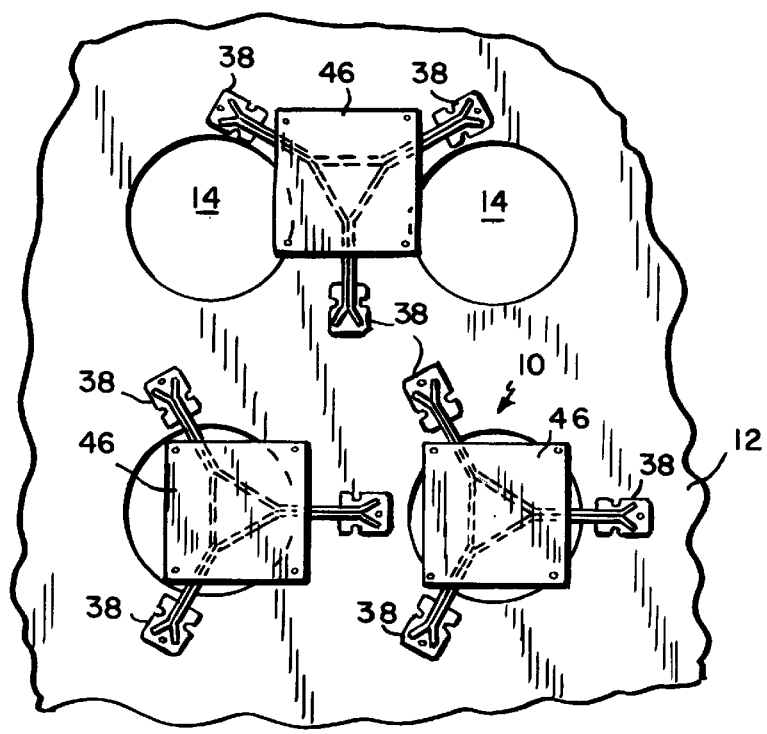
FIG. 2 is a plan view of support tripods of the invention.

Referring to FIGS. 1 and 2, tripods 10 are shown supporting a load in a cleanroom environment. The cleanroom is partially shown and comprises a sub-floor 12 having knock-outs 14. A raised floor 16 is spaced above the sub-floor 12 and is characterized by openings 18.

Figure 3:
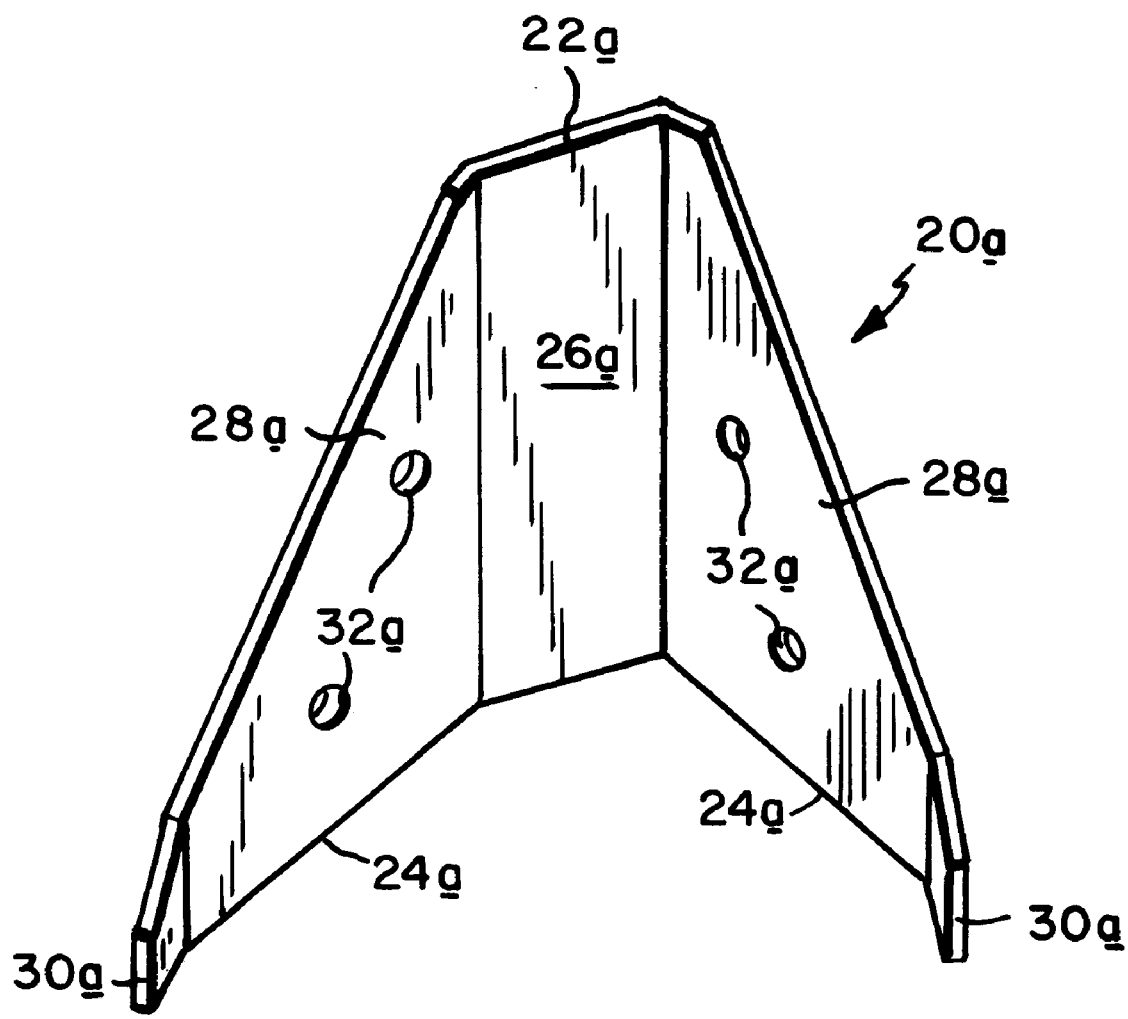
FIG. 3 is an isometric view of a plate used in the formation of a tripod.

Three identical plates are used for the assembly of a tripod 10. Referring to FIG. 3, one of the three plates, plate 20a, is shown. The plate 20a comprises an upper edge 22a and a lower edge 24a. A wall 26a is joined to two mirror image leg sections 28a. The depending outer portions of the legs 28a are turned to form flanges 30a. The leg sections 28a are apertured at 32a.

Figure 5:
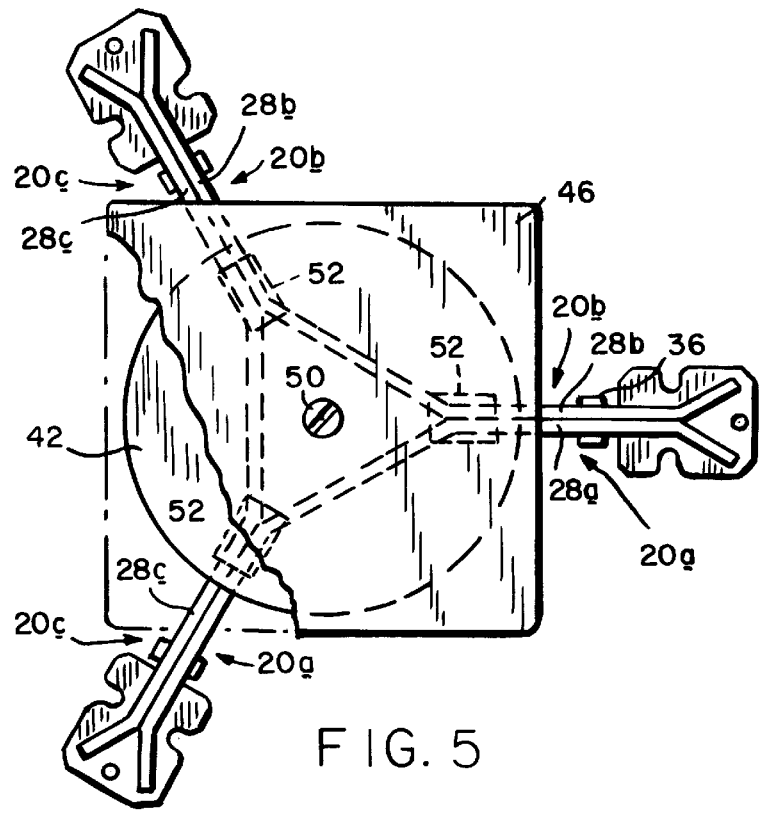
FIG. 5 is a top view of FIG. 3.
Figure 4:
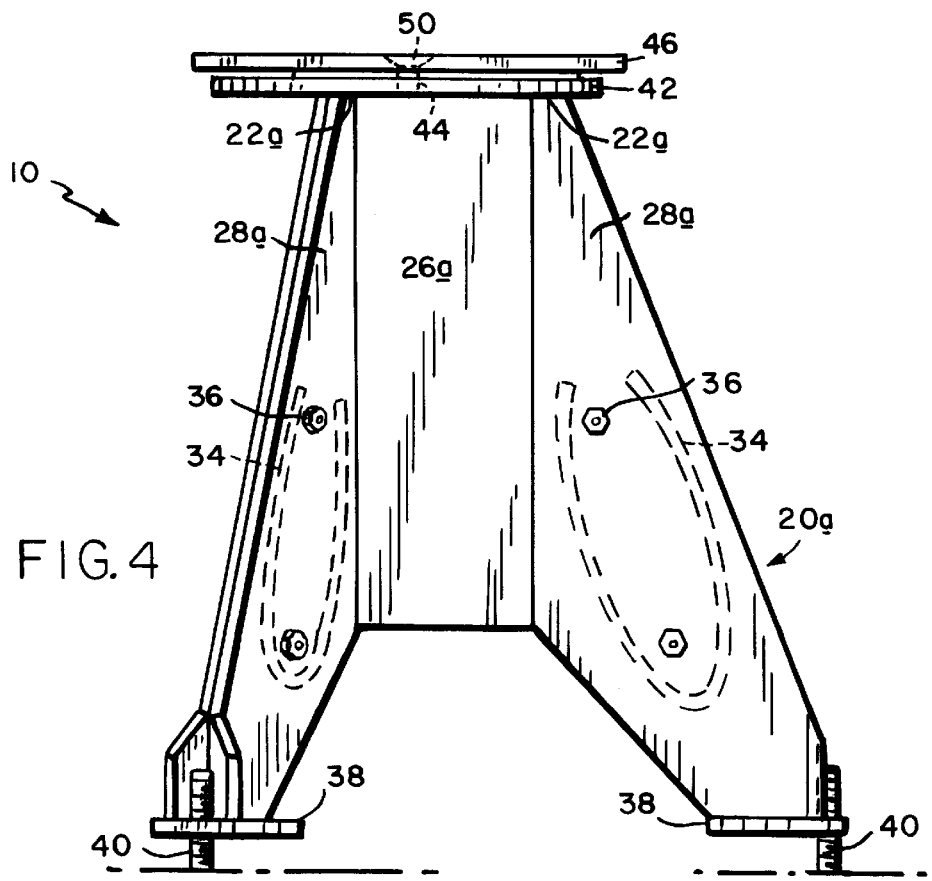
FIG. 4 is a front view of a tripod.

As shown in FIGS. 4 and 5, the tripod 10 comprises three assembled plates 20a, 20b and 20c, together with other components. Prior to assembling the tripod 10, a strip of damping material 34 is sandwiched between the leg sections 28 of the plates 20a, 20b and 20c. Specifically, the damping material 34 is placed between the opposed legs 28a–28b; 28b–28c and 28c–28a.

A suitable damping material would be a viscoelastic elastomer such as butyl rubber or a commercial thermoplastic damping pad. This material would have a dynamic loss modulus of $10^{10}$ Dynes/cm$^2$ at 100–1000 Hz (typically). The damping material is shown as a looped strip. Any geometric configuration can be used, parallel strips, sinusoidal, circular, etcetera. Also, the damping material need not be in the form of a strip. It can be uniform or non-uniform pieces of any geometric configuration arrayed between the legs in a uniform or non-uniform pattern.

The plates 20a, 20b and 20c are bolted together as shown by bolts 36. Feet 38 are secured, such as by welding, to the lower edges 24 of the legs 28. Set screws 40 are threaded into the feet 38.

A base plate 42 is secured to the upper edges 22 of the plates 20, such as by welding. The base plate 42 is characterized by a tapped hole 44. A rectangular top plate 46, having an aperture 48, is rotatably secured to the base plate 42 by a threaded fastener 50, e.g. a flathead screw. Friction pads 52 are sandwiched between the top plate 46 and the base plate 42.

In use, when it is known which equipment is to be supported in the cleanroom, and more particularly where the point contacts of the equipment will be located, openings are formed in the raised floor at these locations. Referring to FIGS. 1 and 2, assuming the top plate 46 is a 12" square, then 12" openings 18 are formed in the raised floor 16. The feet 38 of the tripod 10 are set on the sub-floor 12 spanning any knockouts 14. The top plate 46 is rotated until it is aligned with the square opening 18 formed in the raised floor 16 and then fixed or locked into position. The set screws 40 are used to locate the top plate 46 in the opening 18. These steps are repeated for the total number of tripods required. Then the equipment is placed on the support plates of the tripods.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. A tripod for equipment support comprising:

three legs, each having an upper and a lower end, the lower ends secured to ground, wherein the legs are plate-like legs;

a support plate secured to the upper ends of the legs;

means for adjusting the support plate secured to the tripod;

means for damping the tripod formed within a structure of each leg, the tripod characterized by non-resonance, said means for damping not affecting the rigidity of the tripod between ground and the support plate; and wherein the legs comprise three legs joined to one another and the means for damping the tripod are sandwiched between the plates.

2. The tripod of claim 1 wherein the lower ends of the legs have feet secured thereto.

3. The tripod of claim 2 wherein the means for adjusting the plate is secured to the feet.

4. The tripod of claim 3 wherein the means for adjusting comprises threaded shafts secured to the feet.

5. The tripod of claims 1, 2, 3, or 4 wherein a base plate is secured to the upper ends of the legs and the support plate is rotatably secured to the base plate.

6. The tripod of claim 5 wherein means for damping has a dynamic loss modulus of $10^{10}$ Dynes/cm$^2$ at 100–1000 Hz.

* * * * *